(12) United States Patent
Acheson et al.

(10) Patent No.: US 9,670,875 B2
(45) Date of Patent: Jun. 6, 2017

(54) THRUST REVERSERS AND METHODS TO PROVIDE REVERSE THRUST

(71) Applicant: The Boeing Company, Chicago, IL (US)

(72) Inventors: Kurt Erik Acheson, Seattle, WA (US); Chen Chuck, Mercer Island, WA (US)

(73) Assignee: The Boeing Company, Chicago, IL (US)

(*) Notice: Subject to any disclaimer, the term of this patent is extended or adjusted under 35 U.S.C. 154(b) by 1297 days.

(21) Appl. No.: 13/665,596

(22) Filed: Oct. 31, 2012

(65) Prior Publication Data

US 2014/0117106 A1  May 1, 2014

(51) Int. Cl.
*F02K 1/72* (2006.01)
*F02K 1/76* (2006.01)

(52) U.S. Cl.
CPC .............. *F02K 1/72* (2013.01); *F02K 1/766* (2013.01); *Y02T 50/671* (2013.01)

(58) Field of Classification Search
CPC ... F02K 1/006; F02K 1/08; F02K 1/60; F02K 1/70; F02K 1/72; F02K 1/76; F02K 1/766; F02K 9/86; B05B 1/08; B05B 1/34; F15C 1/22; F15D 1/12; A01G 25/023; A01G 25/092; Y02T 60/671; B64D 33/04
See application file for complete search history.

(56) References Cited

U.S. PATENT DOCUMENTS 6,151,883 A * 11/2000 Hatrick ................ F02K 1/72
                                                        239/265.29

8,151,550 B2    4/2012 Dehu et al.
2010/0181435 A1 * 7/2010 Sakurai ............... B64C 21/02
                                                        244/209
2012/0023900 A1  2/2012 Flin et al.

OTHER PUBLICATIONS

Yao et al., "The Aerodynamic Performance of a Thrust Reverser Cascade," 24th International Congress of the Aeronautical Sciences; Aug. 29, 2004; (pp. 7).
Canadian Intellectual Property Office, "Examination Search Report," issued in connection with Application No. 2,822,165, Dec. 16, 2015, 4 pages.
Canadian Intellectual Property Office, "Examination Search Report," issued in connection with Application No. 2,822,165, Feb. 27, 2015, 4 pages.
Yao et al., "The Effect of the Porous Diverter Fairing on the Aerodynamic Performance of Natural Blockage Thrus Reverser," 42nd AIAA Aerospace Sciences Meeting and Exhibit Jan. 5-8, 2004; (pp. 7).

* cited by examiner

*Primary Examiner* — Ehud Gartenberg
*Assistant Examiner* — Jared W Pike
(74) *Attorney, Agent, or Firm* — Hanley, Flight & Zimmerman, LLC

(57) ABSTRACT

Thrust reversers and methods to provide reverse thrust are disclosed. An example thrust reverser includes a cascade to direct air from an interior volume of an engine nacelle to generate reverse thrust with respect to a direction of travel, and an air extractor to extract a portion of air approaching the cascade from within the interior volume.

18 Claims, 7 Drawing Sheets

THRUST REVERSERS AND METHODS TO PROVIDE REVERSE THRUST

BACKGROUND

Aircraft engines are often provided with thrust reversal mechanisms to slow the aircraft during landing. Thrust reversal includes blocking forward thrust or redirecting the forward thrust into a reverse thrust.

Known thrust reversers add substantial weight to the engine, which reduces the fuel efficiency of the engine, the capacity of the aircraft to which the engine is attached, or both. Accordingly, there is a need for thrust reversers that provide higher performance and/or reduce weight.

SUMMARY

A disclosed example thrust reverser includes a cascade to direct air from an interior volume of an engine nacelle to generate reverse thrust with respect to a direction of travel, and an air extractor to extract a portion of air approaching the cascade from within the interior volume.

Another disclosed example thrust reverser includes a diverter door to, when open, direct air from an interior volume of an engine nacelle to generate reverse thrust with respect to a direction of travel, and an air extractor to extract a portion of air approaching the diverter door from within the interior volume.

A disclosed example method includes exposing a thrust reverser to generate reverse thrust by directing air from an interior volume of a nacelle of an engine through the thrust reverser, and extracting a portion of the air approaching the thrust reverser from the interior volume.

A disclosed example engine includes a nacelle, a thrust reverser to generate reverse thrust by directing air from an interior of the nacelle to an exterior of the nacelle, and an air extractor to extract a portion of air approaching the thrust reverser from within the interior volume.

The features, functions, and advantages that have been discussed can be achieved independently in various embodiments or may be combined in yet other embodiments, further details of which can be seen with reference to the following description and drawings.

DETAILED DESCRIPTION

Thrust reversers on aircraft engines convert all or a portion of forward thrust generated by the engine into reverse thrust. Reverse thrust is used to decrease the speed of the aircraft, such as when landing. Known thrust reversers are relatively heavy and reduce the performance of the aircraft, the efficiency of the aircraft, and/or the load that can be borne by the aircraft.

Example thrust reversers, methods of reversing thrust, engines, and aircraft disclosed herein provide more efficient thrust reversal. As a result, relative to known thrust reversers, example thrust reversers, methods of reversing thrust, engines, and/or aircraft disclosed herein provide thrust reversers having decreased weight without sacrificing thrust reversal performance.

While the diverter fairing contributes to the diversion of bypass air from the engine nacelle through a cascade, known diverter fairings also reduce the effectiveness of one or more cascade vanes. In some examples disclosed herein, an air extractor extracts at least a portion of air from a volume adjacent the diverter fairing to increase the effectiveness of the cascade vanes, thereby enabling a reduction in the length of the cascade and, thus, a reduction in weight of the engine. Some example thrust reversers disclosed herein increase the performance of a multi-door type thrust reverser. As a result, the diverter door may be made smaller without sacrificing performance.

Some example thrust reversers further include an air ejector to eject the extracted air. For example, the air ejector may eject the extracted air from the engine nacelle at a location forward of the reverser thrust efflux in a direction of travel of the engine. These example air ejectors further increase the performance of the thrust reverser by reducing flow separation and increasing reverser effectiveness. In some examples, the air ejector ejects the extracted air from a location within the engine nacelle.

As used herein, a "direction of travel" refers to an intended or designed direction in which an engine is to cause a platform to move in a forward mode of operation. Reference to a "direction of travel" is relative to the engine, relates to actual or intended movement and, thus, does not require actual movement or travel of the engine. Furthermore, as used herein, a position "forward" of a reference in the direction of travel refers to a position that, when traveling in the designated direction of travel, will reach a given plane perpendicular to the direction of travel prior to the reference. Conversely, as used herein, a position "following" or behind a reference in the direction of travel refers to a position that, when traveling in the designated direction of travel, will reach a given plane perpendicular to the direction of travel subsequent to the reference.

Figure 1:
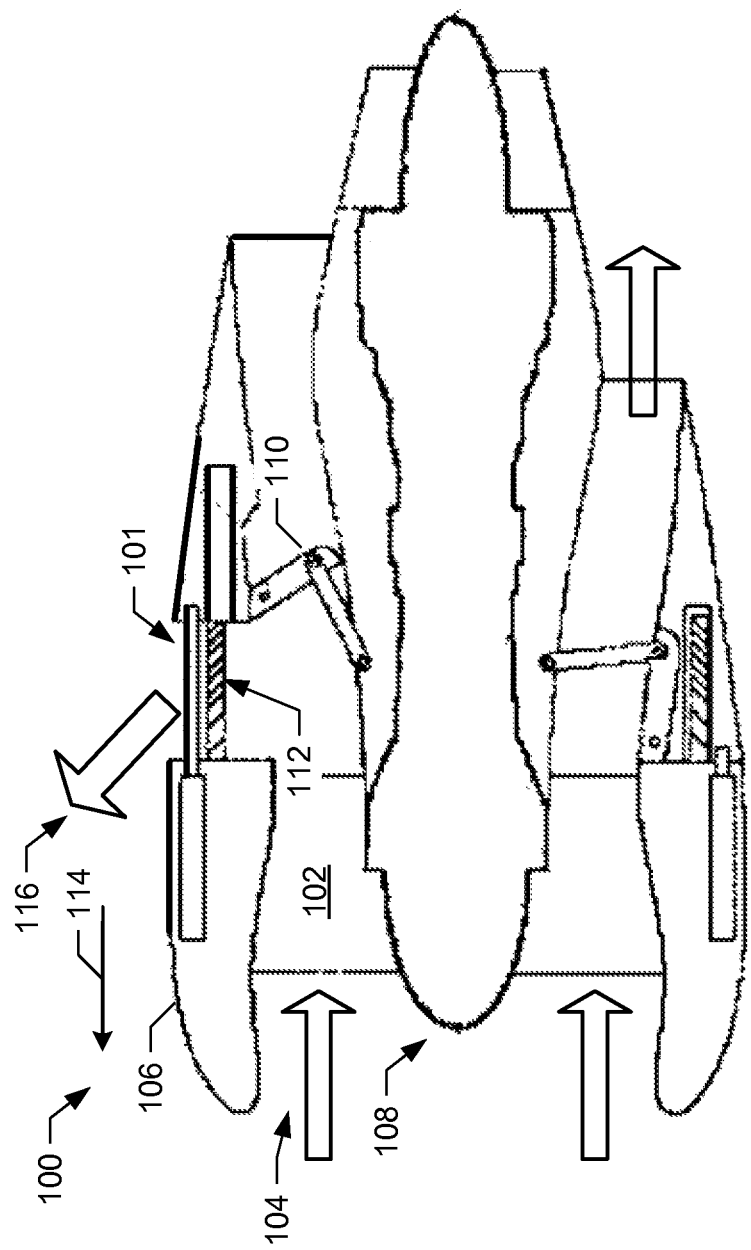
FIG. 1 illustrates an engine including an example cascade thrust reverser.

FIG. 1 illustrates a known engine 100 including a cascade thrust reverser 101. The engine 100 of FIG. 1 is a turbofan engine that can reverse thrust to more rapidly slow down the engine (and any platform to which it is attached). The engine 100 intakes an airflow 102 via a fan inlet 104. The airflow 102 is urged through a nacelle 106 that contains a turbine assembly 108.

During thrust reversal, instead of being ejected from the rear of the engine 100 to generate forward thrust, the airflow 102 is blocked by a blocking door 110 and directed outward from the nacelle 106 in a generally forward direction 114 via a cascade 112 to generate reverse thrust 116.

Figure 2:
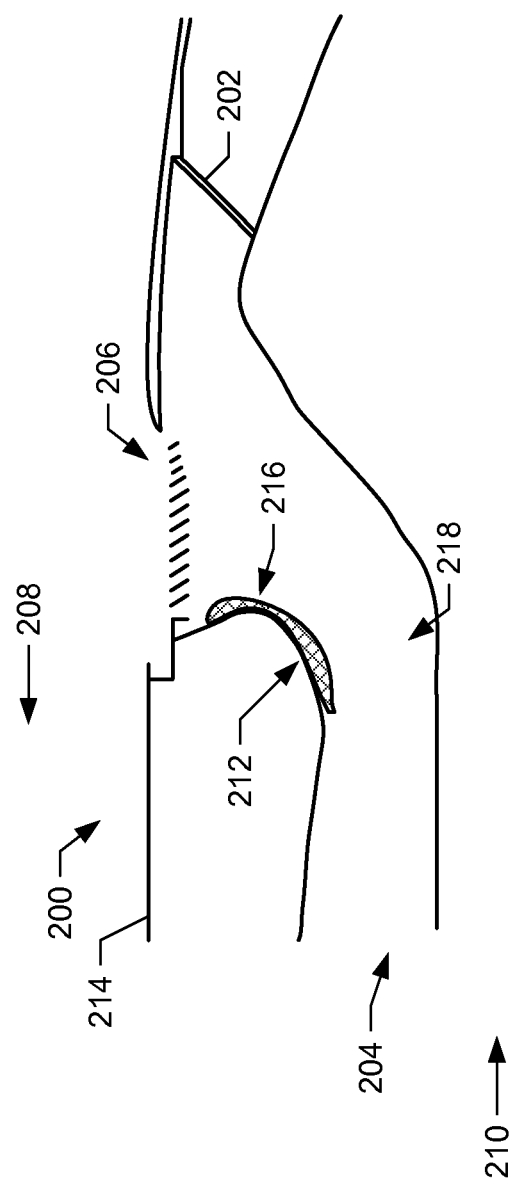
FIG. 2 illustrates a known thrust reverser.

FIG. 2 illustrates a known cascade thrust reverser 200. The cascade thrust reverser 200 is used in a turbofan engine such as the known engine 100 of FIG. 1. The reverser 200 of FIG. 2 includes a retractable blocking door 202 that, when extended, redirects an intake airflow 204 from being ejected as forward thrust to being ejected as reverse thrust.

To generate the reverse thrust, the intake airflow 204 is redirected through a cascade 206. The cascade 206 includes a set of vanes that direct the airflow 204 in a generally forward direction 208 opposite an air intake direction 210. As the airflow 204 is directed through the cascade 206, the airflow 204 flows over a diverter fairing 212 (also known as a "bullnose") portion of a nacelle 214. A region 216 directly adjacent the bullnose 212 experiences an increase in airflow speed and a resulting decrease in air pressure relative to the airflow 204 in a remainder of a fan duct 218. The region 216 causes a decrease in flow speed, and a corresponding increase in pressure, of air approaching the region 216. As the air in the region 216 approaches the cascade 206, the air experiences an adverse pressure gradient (e.g., rising pressure). Due to the adverse pressure gradient, the air approaching the cascade 206 may separate from the diverter fairing 212. This separation results in a reduction in air flow through the portion of the cascade 206 closest to the diverter fairing 212 to less than the surface area of that portion of the cascade 206 would otherwise permit. The decrease in air flow through the cascade 206 near the bullnose 212 therefore reduces the effectiveness of the cascade 206.

Figure 3:
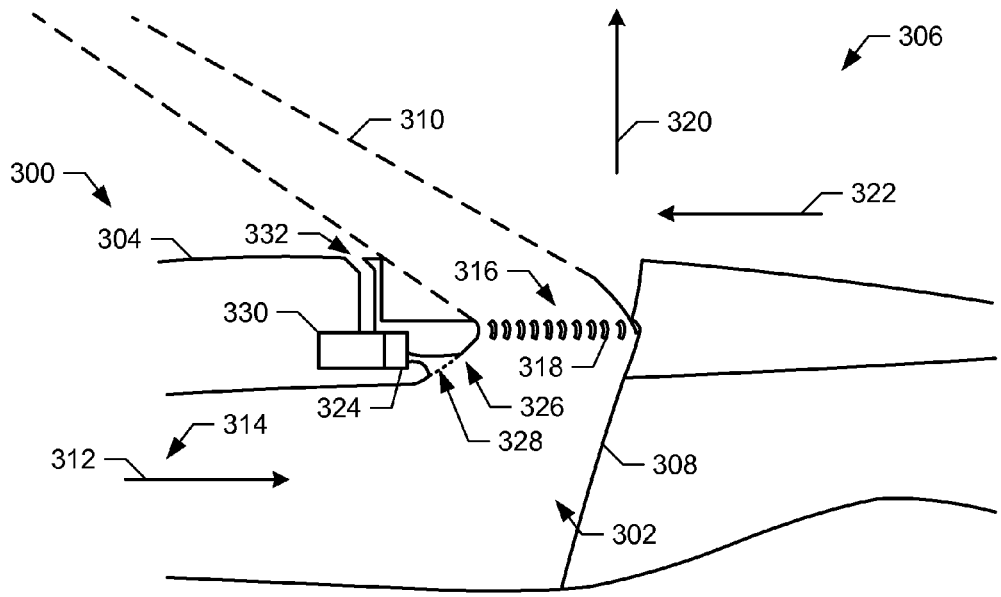
FIG. 3 illustrates an example cascade thrust reverser that may be used to implement the example engine of FIG. 1.

FIG. 3 illustrates an example cascade thrust reverser 300 that may be used provide thrust reversal in the engine 100 of FIG. 1. Compared to the known thrust reverser 200 of FIG. 2, the example cascade thrust reverser 300 of FIG. 3 provides increased reverse thrust and/or has a reduced engine weight per unit of reverse thrust. As a result, engines implementing the example thrust reverser 300 of FIG. 3 may have reduced weight, improved fuel efficiency, increased reverse thrust performance, and/or some combination of these benefits.

The example cascade thrust reverser 300 includes a fan duct 302 within a nacelle 304 of an engine 306 implementing the reverser 300. The example thrust reverser 300 further includes a blocking door 308, which is extended to cause reverse thrust efflux 310 to be ejected from the engine 306. The example fan duct 302 receives an intake airflow 312 via a fan inlet 314.

When extended, the blocking door 308 directs the airflow 312 toward a cascade 316 that includes multiple vanes 318. The vanes 318 further divert the airflow 312 from an outward direction 320 to the reverse efflux 310 generally in a forward direction 322 (e.g., toward the direction of travel of the engine 306, opposite the direction of the intake airflow 312).

The example thrust reverser 300 further includes an air extractor 324 adjacent a diverter fairing or bullnose 326 of the nacelle 304. The example air extractor 324 of FIG. 3 extracts air from the fan duct 302 via an opening 328 in the bullnose 326. In the example of FIG. 3, the opening 328 is adjacent a region where the airflow 312 would, absent the air extractor 324, increase in speed and decrease in pressure.

The example thrust reverser 300 of FIG. 3 includes an air ejector 330 in communication with the air extractor 324. The example air ejector 330 ejects air extracted via the air extractor 324 from a location 332 on the exterior surface of the nacelle 304 (e.g., from the exterior surface of the engine 306). In the example of FIG. 3, the location 332 is immediately ahead (in the direction of travel of the engine 306) of the cascade 316 and the reverser efflux 310.

In combination, the example air extractor 324 and the air ejector 330 of FIG. 3 further increase the effectiveness of the cascade 316. In particular, the effectiveness of the first vane(s) 318 closest to the bullnose 326 is increased and the reverser efflux 310 is directed more in the forward direction 322 (also the direction of travel), thereby increasing the effectiveness of the efflux 310 at slowing the engine 306 (e.g., in the direction of travel). The increased effectiveness of the cascade 316 results from extraction of weak (e.g., low energy) boundary layer flow adjacent the bullnose 326 by the air extractor 324. Removal of the weak boundary layer flow enables the air flow in the fan duct 302 to maintain or increase a pressure in the area around the bullnose 326 to the cascade 316. The additional flow to the cascade 316 increases the effectiveness of the cascade 316. As a result, the example cascade 316 may be shorter in length (and, thus, lower in weight) than the cascade 206 of FIG. 2 while achieving the same reverse thrust force on the engine 306.

The example air extractor 324 may be implemented by, for example, a suction pump that extracts air via the opening 328. However, any other type of air extraction device may be used. The example air ejector 330 may be implemented by a second pump or by the ejection of air from the air extractor 324. In some examples, the air ejector 330 increases the air pressure of the air extracted by the air extractor 324 to eject the air from the location 332 at an appropriate ejection speed (e.g., to overcome external air pressure).

Figure 4:
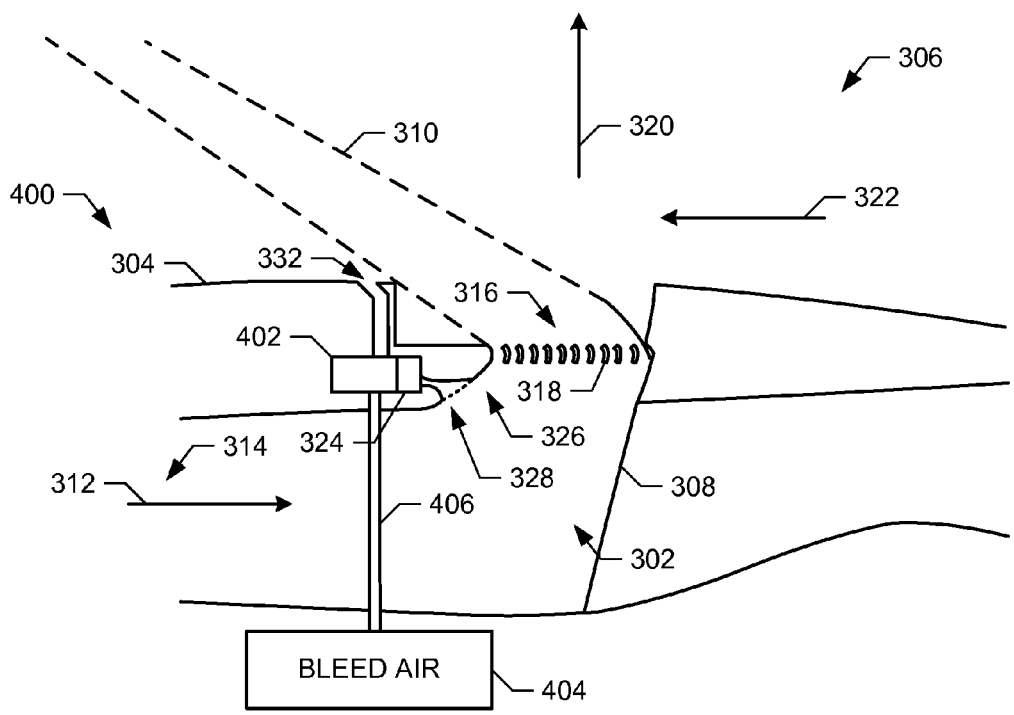
FIG. 4 illustrates another example cascade thrust reverser that may be used to implement the example engine of FIG. 1.

FIG. 4 illustrates another example cascade thrust reverser 400 that may be used to implement the example engine 100 of FIG. 1. The example cascade thrust reverser 400 may be implemented in the engine 306 of FIG. 3 and includes the example fan duct 302, the example nacelle 304, the example blocker door 308, the example fan inlet 314, the example cascade 316 and vanes 318, the example air extractor 324, the example bullnose 326, the example opening 328, and the example ejection location 332 of FIG. 3.

In contrast to the example cascade thrust reverser 300, the example cascade thrust reverser 400 of FIG. 4 includes an air ejector 402 to accept bleed air 404 (e.g., high pressure and/or high heat air from a turbine assembly of the engine 306) via a bleed air tube 406. The example air ejector 402 uses the bleed air 404 to entrain air extracted by the air extractor 324 via the opening 328 and to eject the entrained air from the nacelle 304 at the exterior location 332. Bleed air 404 has a high pressure relative to the exterior of the nacelle 304 and relative to the air extracted by the air extractor 324. The resulting velocity generated by the bleed air 404 as it enters the air ejector 402 entrains the air in the air ejector 402. As a result, the pressure in the air ejector 402 is reduced and the air ejector 402 draws in additional air from the fan duct 302 via the opening 328. Thus, the air ejector 402 removes weak (e.g., low energy) boundary layer flow near the bullnose 326. Removal of the weak boundary layer flow enables the air flow in the fan duct 302 to maintain or increase a pressure in the area around the bullnose 326 to the full cascade 316 and enables the air in the fan duct 302 to more fully flow through the vanes 318 and increase the effectiveness of the cascade 316. Additionally, air ejected from the exterior location 332 entrains air from the reverser efflux 310 and results in a more forward-directed efflux (e.g., directed more in the forward direction 322) and increased forward thrust of the thrust reverser 400 of FIG. 4.

Figure 5:
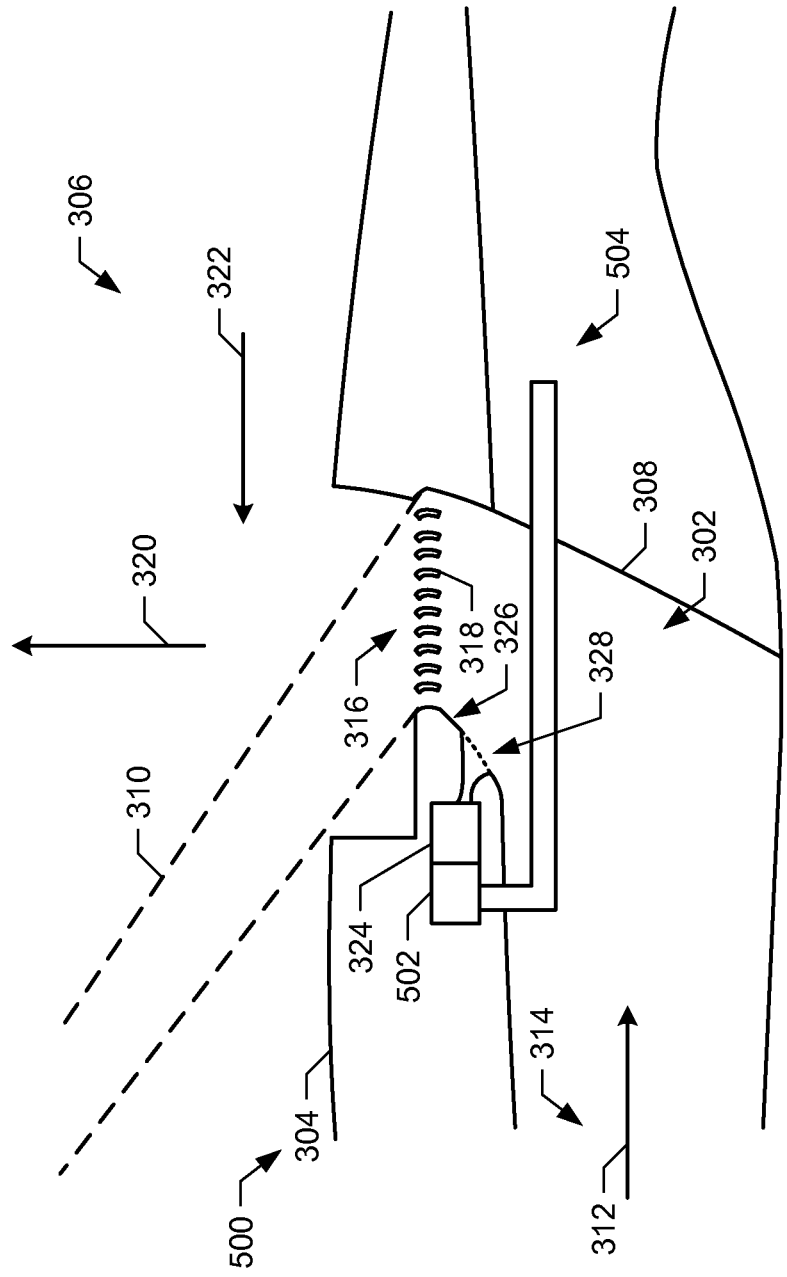
FIG. 5 illustrates another example cascade thrust reverser that may be used to implement the example engine of FIG. 1.

FIG. 5 illustrates another example cascade thrust reverser 500. The example cascade thrust reverser 500 of FIG. 5 may be implemented in the engine 306 of FIG. 3 and includes the example fan duct 302, the example nacelle 304, the example blocker door 308, the example fan inlet 314, the example cascade 316 and vanes 318, the example air extractor 324, the example bullnose 326, and the example opening 328 of FIG. 3.

Figure 6:
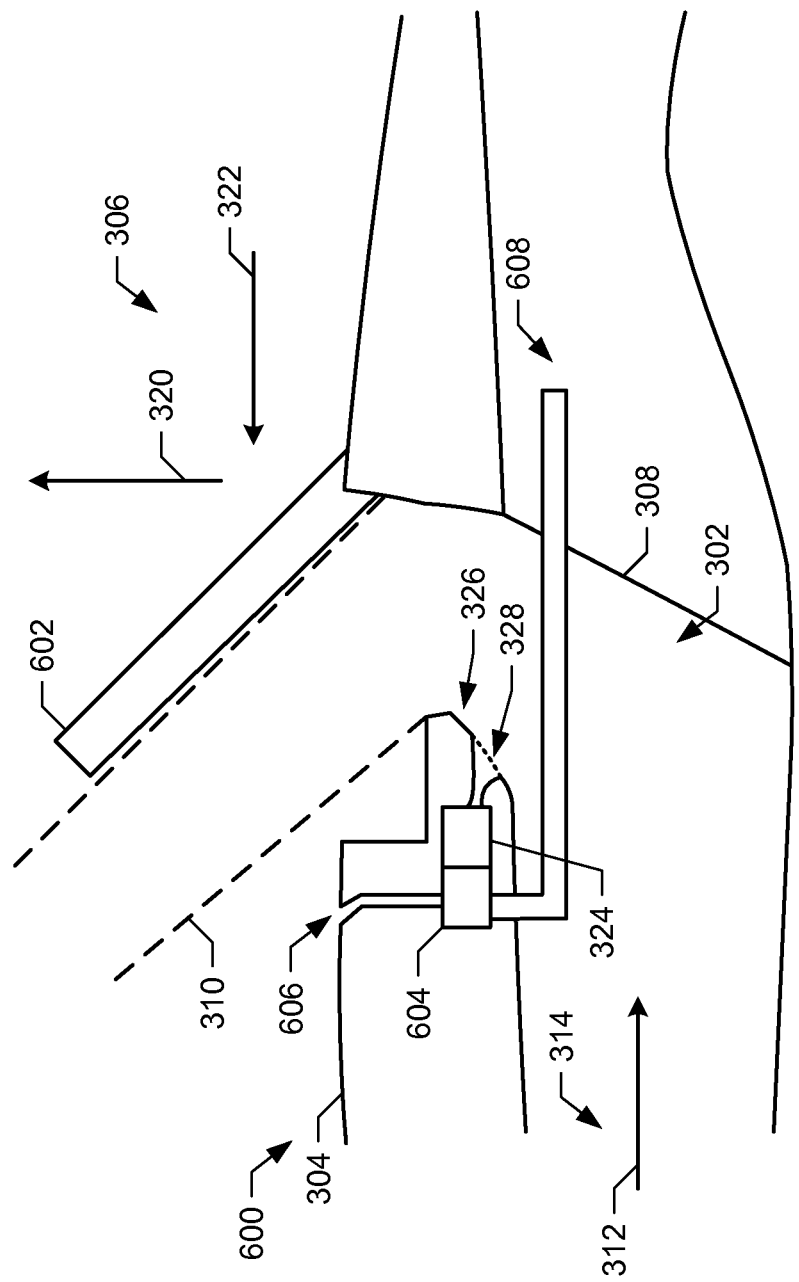
FIG. 6 illustrates an example multi-door thrust reverser that may be used to implement the example engine of FIG. 1.

In contrast to the example cascade thrust reversers 300, 400 of FIGS. 3 and 4, the example cascade thrust reverser 500 of FIG. 5 includes an air ejector 502 that ejects air extracted by the air extractor 324 to a location 504 within the nacelle 304. In the illustrated example, the air ejector 502 ejects the air to a location outside of the fan duct 302 (e.g., past the blocker door 308). In some examples, the air ejector 502 may eject the air within the fan duct 302. The example thrust reverser 500 increases the effectiveness of the cascade 316 (e.g., the first vane(s) 318 of the cascade 316) by extracting weak (e.g., low energy) boundary layer flow adjacent the bullnose 326 via the air extractor 324. Removal of the weak boundary layer flow enables the air flow in the fan duct 302 to maintain or increase a pressure in the area around the bullnose 326 to the full cascade 316, thereby improving the reverse thrust performance of the thrust reverser 500 relative to the known thrust reverser 200 of FIG. 2. FIG. 6 illustrates an example multi-door type thrust reverser 600. The example thrust reverser 600 of FIG. 6 may be implemented in the engine 306 of FIG. 3 and includes the example fan duct 302, the example nacelle 304, the example blocker door 308, the example fan inlet 314, the example air extractor 324, the example bullnose 326, and the example opening 328 of FIG. 3.

Instead of a cascade of vanes, the thrust reverser 600 includes a diverter door 602 that directs the reverser efflux 310 generally in the forward direction 322 to generate reverse thrust. As with the example cascade 316 of FIGS. 3-5, the reverser efflux 310 may be negatively affected by a low-pressure region adjacent the bullnose 326 due to a reduced ability of the air in the low-pressure region to flow past the bullnose 326. Thus, the example thrust reverser 600 includes the example air extractor 324, which extracts air from the volume adjacent the bullnose 326. The example air extractor 324 extracts lower energy flow, enabling the air in the fan duct 302 to more fully flow out of the diverter door 602 and increase the effectiveness of the thrust reverser 600.

The example thrust reverser 600 further includes an air ejector 604. The example air ejector 604 may be similar to the air ejector 330 of FIG. 3 in that the air ejector 604 ejects the air extracted by the air extractor 324 from an exterior location 606 of the nacelle 304. The example exterior location 606 of FIG. 6 is ahead of the reverser efflux 310 in the direction of travel of the engine 306. In some other examples, the air ejector 604 is similar to the air ejector 402 of FIG. 4, and ejects the air to a location 608 within the nacelle 304 (e.g., behind the blocker door 308, within the fan duct 302, etc.). Thus, the example thrust reverser 600 of FIG. 6 increases the effectiveness of thrust reversal in the example engine 306 relative to known thrust reversers. Additionally or alternatively, the example thrust reverser 600 may decrease the weight and/or increase the efficiency of the engine 306 by reducing the size of the diverter door 602 and associated structures, thereby decreasing the weight of the engine 306.

While the example engine 306 of FIGS. 3-6 is illustrated in cross-section, the thrust reversers 300-600 may be implemented in multiple locations and/or contiguously along the circumference of the nacelle 304.

Figure 7:
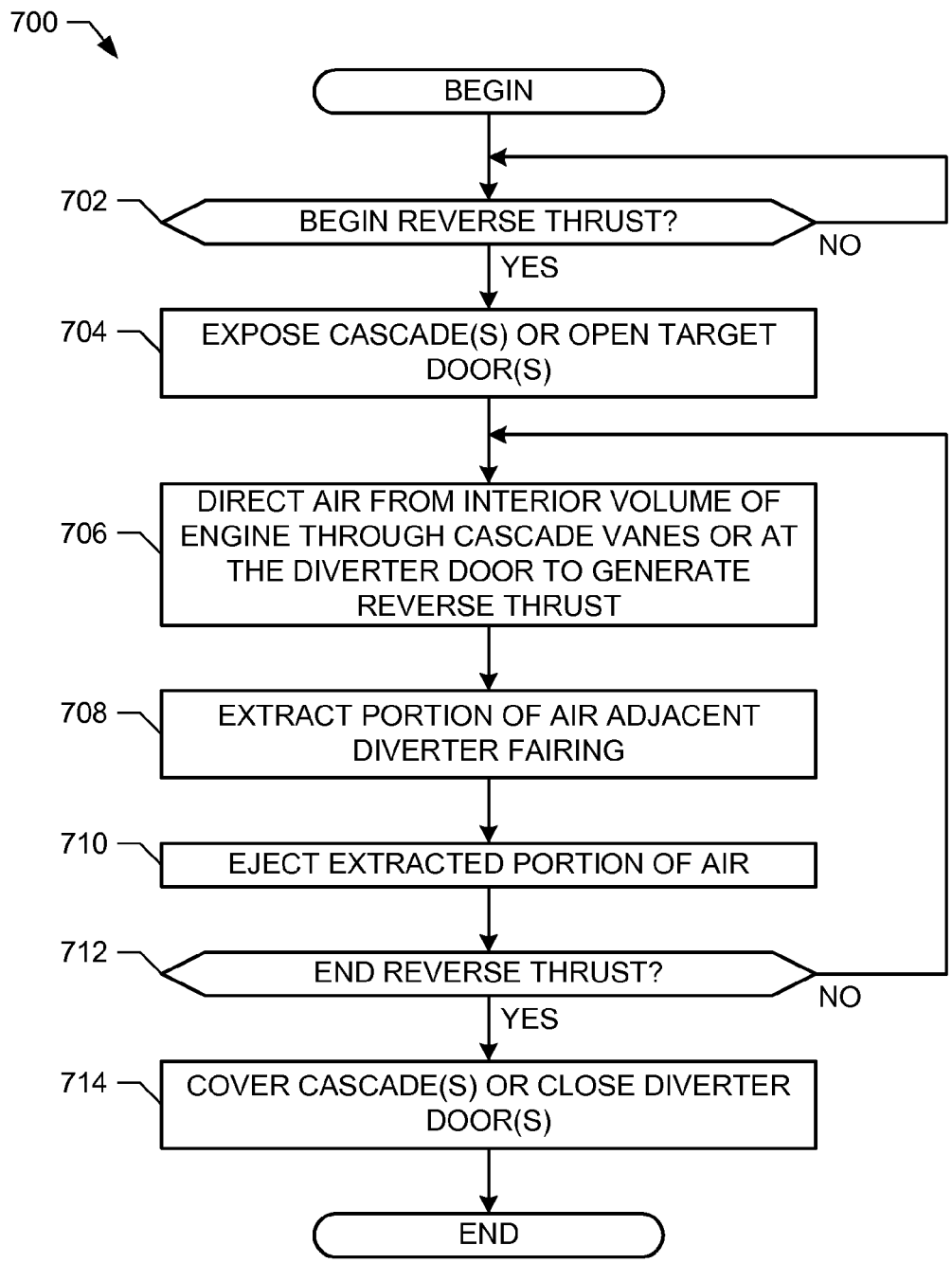
FIG. 7 is a flowchart representative of an example method to provide reverse thrust.

FIG. 7 is a flowchart representative of an example method 700 to provide reverse thrust. The example method 700 may be performed to implement the example thrust reversers 300, 400, 500, and/or 600 of FIGS. 3-6 to provide reverse thrust.

The example method 700 begins by determining whether to begin reverse thrust (block 702). If reverse thrust is not to begin (block 702), control loops to block 702 to await the beginning of reverse thrust. When reverse thrust is to begin (block 702), the example nacelle (e.g., the nacelle 304 of FIGS. 3-5 exposes a cascade (e.g., the cascade 316 of FIGS. 3-5) or opens a diverter door (e.g., the diverter door 602 of FIG. 6) (block 704). A blocker door (e.g., the blocker door 308) directs air from an interior volume of the engine (e.g., the fan duct 302 of the engine 306 of FIGS. 3-6) through cascade vanes (e.g., the cascade vanes 318) or at the diverter door 602 (block 706).

The example method 700 continues by extracting a portion of air adjacent the diverter fairing (e.g., the bullnose 326) (block 708). For example, the air extractor 324 of FIGS. 3-6 extracts a portion of air from a region adjacent the bullnose 326. The example method 700 ejects the extracted portion of the air (block 710). For example, the air ejectors 330, 402, 502, and/or 604 may eject the extracted air from locations 332, 606 external to the nacelle 304 and/or at locations 504, 608 internal to the nacelle 304.

The example method 700 determines whether to end reverse thrust (block 712). If reverse thrust is to continue (block 712), the example method 700 returns to block 706 to continue generating reverse thrust. If reverse thrust is to end (block 712), the example method 700 covers the cascade(s) 716 and/or closes the diverter door(s) 602 (block 714). The example method 700 may then end and/or iterate to generate additional reverse thrust.

Figure 8:
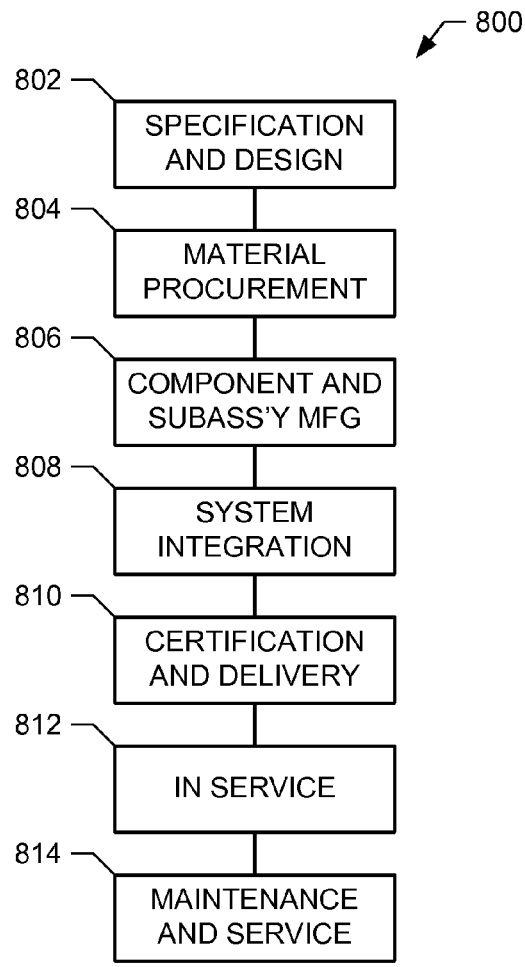
FIG. 8 is a flowchart of platform production and service methodology.
Figure 9:
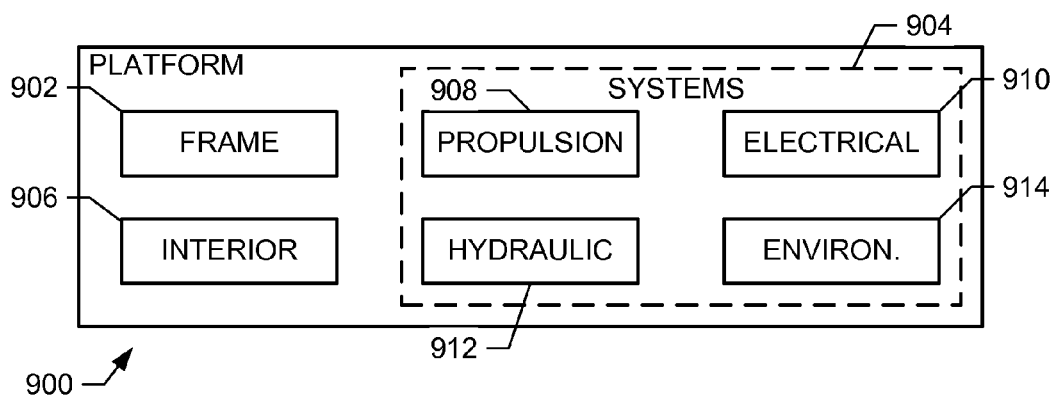
FIG. 9 is a block diagram of a platform.

Embodiments of the disclosure may be described in the context of a platform manufacturing and service method 800 as shown in FIG. 8 and a platform 900, such as an aircraft, as shown in FIG. 9. During pre-production, the example method 800 may include specification and design (block 802) of the platform 900 (e.g., an aircraft), such as the placement(s) and/or design(s) of the example cascade 316 and/or vanes 318, the example air extractor 324, the example bullnose 326, the example air ejectors 330, 402, 502, 604, and/or the example ejection location(s) 332, 504, 606, 608. Preproduction may further include material procurement (block 804). During production, component and subassembly manufacturing (block 806) and system integration (block 808) of the platform 900 (e.g., an aircraft) takes place. During component and subassembly manufacturing (block 806) and/or system integration (block 808), the example cascade 316 and/or vanes 318, the example air extractor 324, the example bullnose 326, the example air ejectors 330, 402, 502, 604, and/or the example ejection location(s) 332, 504, 606, 608 may be attached (e.g., affixed) to structural locations in the engine 306. Thereafter, the platform 900 (e.g., an aircraft) may go through certification and delivery (block 810) in order to be placed in service (block 812). While in service by a customer, the platform 900 (e.g., an aircraft) is scheduled for routine maintenance and service (block 814), which may also include modification, reconfiguration, refurbishment, etc.

Each of the operations of the example method 800 may be performed or carried out by a system integrator, a third party, and/or an operator (e.g., a customer). For the purposes of this description, a system integrator may include without limitation any number of platform (e.g., aircraft) manufacturers and major-system subcontractors; a third party may include without limitation any number of venders, subcontractors, and suppliers; and an operator may be an airline, leasing company, military entity, service organization, and so on.

As shown in FIG. 9, the platform 900 (e.g., aircraft) produced by example method 800 may include a frame 902 (e.g., an airframe) with a plurality of systems 904 and an interior 906. Examples of high-level systems 904 include one or more of a propulsion system 908, an electrical system 910, a hydraulic system 912, and an environmental system 914. The example methods and apparatus disclosed herein may be integrated into the example systems 908-914 to provide reverse thrust. Any number of other systems may be included.

Apparatus and methods embodied herein may be employed during any one or more of the stages of the production and service method 800. For example, components or subassemblies corresponding to production process 806 may be fabricated or manufactured in a manner similar to components or subassemblies produced while the platform 900 (e.g., aircraft) is in service 812. Also, one or more apparatus embodiments, method embodiments, or a combination thereof may be implemented during the production stages 808 and 810, for example, by substantially expediting assembly of or reducing the cost of a platform 900 (e.g., aircraft). Similarly, one or more of apparatus embodiments, method embodiments, or a combination thereof may be utilized while the platform 900 (e.g., aircraft) is in service 912, for example and without limitation, to maintenance and service 814.

Although example methods are described with reference to the flowcharts illustrated in FIGS. 7 and 8, many other methods of implementing the example thrust reversers 300, 400, 500, and/or 600 may alternatively be used. For example, the order of execution of the blocks may be changed,and/or some of the blocks described may be changed, eliminated, or combined.

Although certain example apparatus and methods have been described herein, the scope of coverage of this disclosure is not limited thereto. On the contrary, this disclosure covers all apparatus and methods fairly falling within the scope of the appended claims.

What is claimed is:

1. A thrust reverser, comprising:
   a cascade to direct air from an interior volume of an engine nacelle to generate reverse thrust with respect to a direction of travel;
   an air extractor to extract a portion of air approaching the cascade from within the interior volume; and
   an air ejector to eject the portion of the air to a location on an exterior surface of the engine nacelle, the location being on an exterior of the engine and forward of the cascade in the direction of travel.

2. A thrust reverser as defined in claim 1, wherein the thrust reverser further comprises a diverter fairing, the air extractor to extract the portion of the air from a volume adjacent the diverter fairing.

3. A thrust reverser as defined in claim 1, wherein the cascade comprises a plurality of vanes to direct the air to generate the reverse thrust.

4. A thrust reverser as defined in claim 1, wherein the air extractor comprises a pump.

5. A thrust reverser as defined in claim 4, wherein the air ejector comprises a pump.

6. A thrust reverser as defined in claim 1, wherein the air ejector comprises a pump.

7. A thrust reverser as defined in claim 1, wherein the air ejector is to increase an air pressure of the portion of the air extracted by the air extractor to eject the air from the location at an ejection speed to overcome external air pressure.

8. A thrust reverser for an engine, comprising:
   a cascade;
   an air extractor to extract a portion of an air intake flow approaching the cascade; and
   an air ejector to eject the portion of the air intake flow to a location on an exterior surface of an engine nacelle of the engine, the location being on an exterior of the engine including the cascade and forward of the cascade in a direction of travel of the engine.

9. A thrust reverser as defined in claim 8, wherein the air extractor comprises a pump and the air ejector comprises another pump.

10. A thrust reverser as defined in claim 8, wherein the air ejector is to increase an air pressure of the portion of the air extracted by the air extractor to eject the air from the location at an ejection speed to overcome external air pressure.

11. A method, comprising:
    exposing a thrust reverser to generate reverse thrust by directing air from an interior volume of an engine nacelle of an engine through the thrust reverser;
    extracting a portion of the air approaching the thrust reverser from the interior volume; and
    ejecting the portion of the air to a location on an exterior surface of the engine nacelle of the engine, the location being on an exterior of the engine and forward of the thrust reverser in a direction of travel of the engine.

12. A method as defined in claim 11, wherein extracting the portion of the air comprises extracting the portion of the air from a volume adjacent a diverter fairing.

13. A method as defined in claim 11, wherein the thrust reverser comprises a cascade type thrust reverser.

14. A method as defined in claim 11, further comprising increasing an air pressure of the portion of the air to an increased air pressure, the ejecting of the portion of the air including ejecting the portion of the air at the increased air pressure.

15. An engine comprising:
    a nacelle;
    a thrust reverser to generate reverse thrust by directing air from an interior of the nacelle to an exterior of the nacelle;
    an air extractor to extract a portion of air approaching the thrust reverser from within the interior of the nacelle; and
    an air ejector to eject the portion of the air to a location on an exterior surface of the nacelle, the location being on the exterior of the engine and forward of the thrust reverser in a direction of travel of the engine.

16. An engine as defined in claim 15, wherein the thrust reverser is a cascade type thrust reverser.

17. An engine as defined in claim 15, wherein the air ejector is to increase an air pressure of the portion of the air extracted by the air extractor to eject the air from the location at an ejection speed to overcome external air pressure.

18. An engine as defined in claim 15, wherein the air extractor comprises a pump and the air ejector comprises another pump.

* * * * *